US012754907B2

(12) United States Patent
Sengupta et al.

(10) Patent No.: US 12,754,907 B2
(45) Date of Patent: Oct. 6, 2026

(54) SYSTEM AND METHOD FOR ENHANCED SCHEMA DISCOVERY AND QUERY GENERATION

(71) Applicant: INTUIT INC., Mountain View, CA (US)

(72) Inventors: Rachit Sengupta, Mountain View, CA (US); Sivashanker Thiruchittampalam, Toronto (CA); Daniel Moise, Edmonton (CA); Hui Chen, Mountain View, CA (US); Daniel Li, Mountain View, CA (US); Tharathorn Rimchala, Mountain View, CA (US); Horace Chan, Edmonton (CA); John Patrick Symborski, Edmonton (CA)

(73) Assignee: INTUIT INC., Mountain View, CA (US)

( * ) Notice: Subject to any disclaimer, the term of this patent is extended or adjusted under 35 U.S.C. 154(b) by 27 days.

(21) Appl. No.: 18/789,376

(22) Filed: Jul. 30, 2024

(65) Prior Publication Data

US 2026/0037506 A1 Feb. 5, 2026

(51) Int. Cl.

| | |
|---|---|
| ***G06F 16/2452*** | (2019.01) |
| ***G06F 16/242*** | (2019.01) |
| ***G06F 40/30*** | (2020.01) |

(52) U.S. Cl.
CPC .... *G06F 16/24522* (2019.01); *G06F 16/2423* (2019.01); *G06F 40/30* (2020.01)

(58) Field of Classification Search
CPC . G06F 16/24522; G06F 16/2423; G06F 40/30
See application file for complete search history.

(56) References Cited

U.S. PATENT DOCUMENTS

| | | | | |
|---|---|---|---|---|
| 12,386,799 | B1 * | 8/2025 | Akula | G06F 16/215 |
| 12,443,595 | B1 * | 10/2025 | Sehwag | G06F 16/2425 |
| 2019/0103101 | A1 * | 4/2019 | Danila | G10L 15/22 |
| 2023/0109718 | A1 * | 4/2023 | Polen | G06F 16/212 707/803 |
| 2024/0062016 | A1 * | 2/2024 | Tong | G06F 40/20 |
| 2024/0362278 | A1 * | 10/2024 | PerezLeon | G06F 40/40 |

OTHER PUBLICATIONS

Li Dong and Yu Bingjun, “A mobile subset technic of mobile DB in XML”, 2005 2nd Asia Pacific Conference on Mobile Technology, Applications and Systems, Guangzhou, China, 2005 (Year: 2005).*

* cited by examiner

*Primary Examiner* — Matthew J Ellis
(74) *Attorney, Agent, or Firm* — DLA PIPER LLP US

(57) ABSTRACT

A system and method are provided for enhanced schema discovery and query generation.

20 Claims, 7 Drawing Sheets minimum schema:

300

```
type Query {
""" Look up person account by accountId """
c360PersonAccount(input: C360_PersonAccountInput!): C360_PersonAccount
}


""" Specifies the person account to return. You must provide the user's accountId.
"""
input C360_PersonAccountInput {
  """ The user's account id """
  accountId: ID!
}


type C360_PersonAccount {
  """
  DG 2.0 deletion request timestamp for Data Governance 2.0 and CCPA compliance
  """
  event_timestamp: String
  id: ID!
  """Indicator to filter out test user entity"""
  isTest: Boolean
  """Latest visitor id associated with a user"""
  latestVisitorId: String
  """(deprecated) Id namespace of a user."""
  namespace: String
  """
  Dummy attribute for user ck import consented data replay job; an internal attribute to C360 system
  """
  replayCkImportConsentDate: String
  """DG 2.0 deletion request transaction id"""
  txnId: String
}
```

*FIG. 3*

400

GraphQL query:

```
query RandomQuery($c360PersonAccount_input:
C360_PersonAccountInput!) {
  c360PersonAccount(input: $c360PersonAccount_input) {
    event_timestamp
    id
    isTest
    latestVisitorId
    namespace
    replayCkImportConsentDate
    txnId
  }
}
```

*FIG. 4*

SYSTEM AND METHOD FOR ENHANCED SCHEMA DISCOVERY AND QUERY GENERATION

BACKGROUND OF THE DISCLOSURE

There are a variety of tools that help human developers write queries in schematized languages (e.g., GraphQL) so that such queries can be employed in their tasks. However, it is often difficult for developers to find the correct fields to use to retrieve the user data needed for the task. This difficulty is especially present when the developer is attempting to retrieve data from large schemas (e.g., a GraphQL SuperGraph) with thousands of entities, types, and fields. While some existing large language model (LLM) based solutions exist, they do not perform to a desirable level. In particular, naively prompting third party or open-source LLMs without knowledge about the relevant schema leads to undesirable results. In addition, an alternative to naive LLM prompting is to use the schema itself as a contextual knowledge graph to enable the LLM to have a deep understanding of relationships as well as the connections between each field. However, most of these schemas are far too large (i.e., they contain too many tokens to fit in the LLM context window and inclusion is too expensive) to be supported by many existing LLMs. Moreover, prompting LLMs with extremely large context has been shown to have the loose-in-the-middle problem in which an LLM is not able to retrieve some of the information embedded in the context. Finally, the process of providing full schemas as context to LLMs via retrieval augmented generation (RAG) has several drawbacks. Specifically, the large size and complexity of typical schemas leads to slow inference speeds, high latency, and increased potential for hallucination by the LLM, all of which are undesirable.

BRIEF DESCRIPTION OF THE FIGURES

FIG. 3 is an example input LLM schema according to example embodiments of the present disclosure.

FIG. 4 is an example GraphQL query generated by an LLM according to example embodiments of the present disclosure.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the present disclosure relate to a system and method for enhanced schema discovery and query generation. The disclosed system and method can assist human developers write queries for their tasks in schematized languages, such as GraphQL, SQL, Protocol Buffers (protobuf), JSON (e.g., in the context of a large JSON schema). For example, the disclosed system and method can operate as a tool that allows users to express tasks in natural language and generate a list of potential attributes and/or a query (e.g., a GraphQL query) to accomplish the specified tasks. In some embodiments, the disclosed principles involve custom chunking of a supergraph and embedding the chunks into a vector database. Then, the system can perform retrievals based on natural languages inputs from a user and dynamic schema generation based on the retrieved fields to narrow down the candidate subschemas that will eventually inform what is included as context for an LLM. Then, the LLM can be used to generate either natural language responses or GraphQL query generation responses based on the original user query.

The disclosed system and method can offer various technical advantages. In particular, reducing the size of the input schema can lead to improved performance on the attribute fields identified and the queries generated by the LLM in accuracy, recall, and code executability. In addition, reducing the size of the schema can enhance the inference speed and reduce latency by reducing context processing requirements. Finally, reducing the size of the schema can limit the LLM's ability to hallucinate and offer improved control over the model's performance and behaviors.

Figure 1:
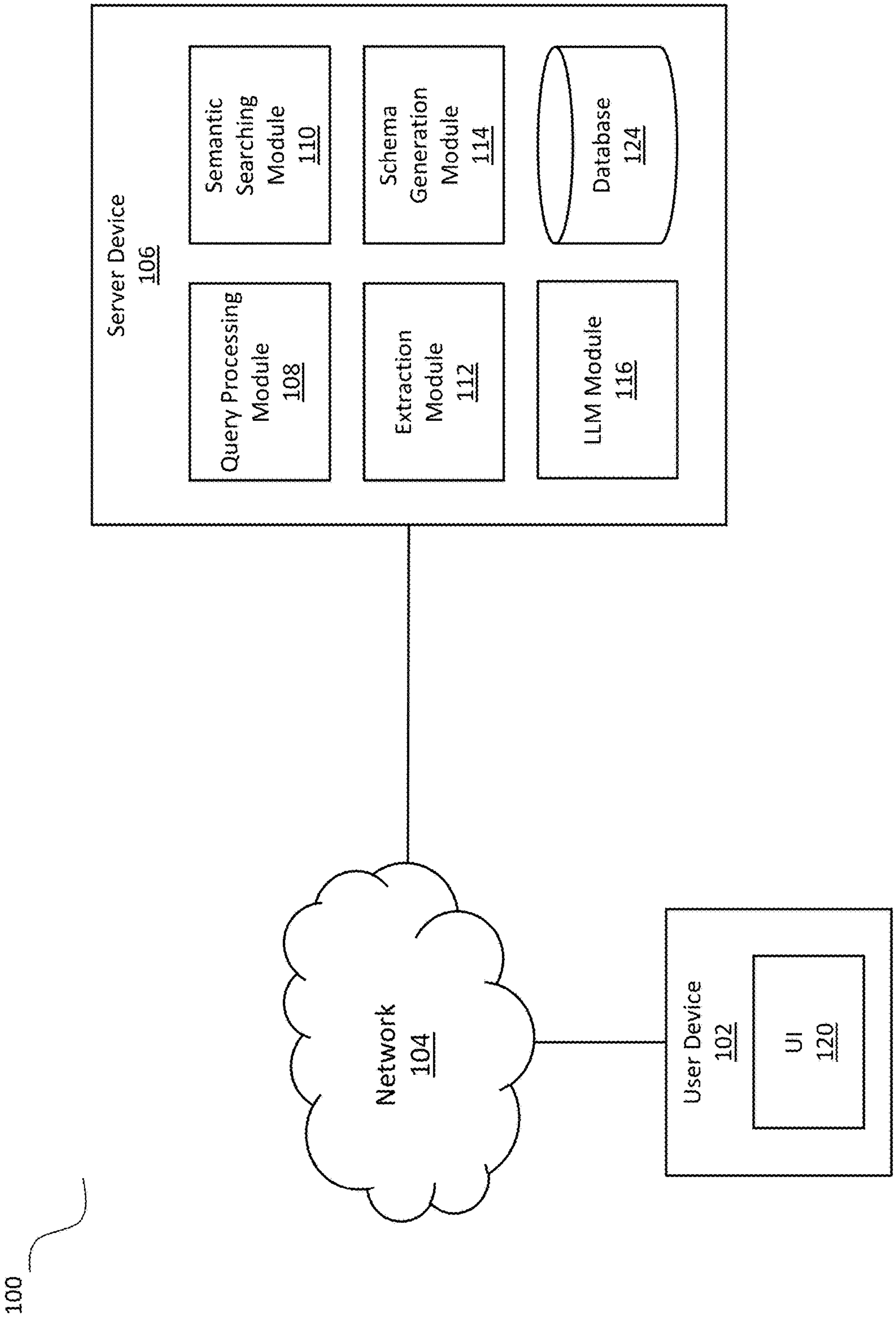
FIG. 1 is a block diagram of an example system for enhanced schema discovery and query generation according to example embodiments of the present disclosure.

FIG. 1 is a block diagram of an example system 100 for enhanced schema discovery and query generation according to example embodiments of the present disclosure. The system 100 can include one or more user devices 102 (generally referred to herein as a "user device 102" or collectively referred to herein as "user devices 102") that can access, via network 104, a server 106 to interact with an LLM-based assist tool (e.g., LLM module 116) via UI tools 120. For example, the server 106 can function as a tool or chatbot that receives input questions from the user device and generates responses thereto, which can include identifying specific attributes and/or generating queries in a specified schematized language such as GraphQL. The server 106 and its various modules, described below, can execute various content evaluation processes.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, tablet, or other suitable device. In some embodiments, a user device 102 can be the same as or similar to the computing device 700 described below with respect to FIG. 7. In some embodiments, the system 100 can include any number of user devices 102.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 600 described below in the context of FIG. 6.

As shown in FIG. 1, the server 106 of the illustrated embodiment includes a query processing module 108, a semantic searching module 110, an extraction module 112, a schema generation module 114, and an LLM module 116. The server 106 can also include a database 124 that is configured to store and maintain a GraphQL schema or supergraph. It is important to note that other schematized language schemas can be utilized herein but, for ease of discussion, the schema is referred to herein as a GraphQL schema. In some embodiments, the database 124 can include a chunked version of the GraphQL schema to better facilitate efficient processing and analysis when performing the tasks disclosed herein. For example, the GraphQL schema can first be chunked into individual attribute level chunks. In some embodiments, each chunk can include an attribute name, an attribute description, and a canonical attribute name. In some embodiments, a canonical attribute name can describe the entire path of an attribute from the root node to the leaf node. An example canonical attribute name for a tax filing status attribute can be C360_Person- Account.tax.insights.taxFilingStatus. In other words, the canonical attribute name indicates which data to jump through to ultimately obtain the attribute. In some embodiments, the full canonical path for a specific attribute can be stored in the metadata of the field within the database 124. In some embodiments, the database 124 can be a vector database to enable vector searches to be performed to identify relevant documents and materials. One such example is a Chroma Database. In some embodiments, the database 124 can employ one or more of indexing and querying techniques that can be used for hierarchical clustering or partitioning. The use of such indexing and querying techniques can enable parallel processing, caching, and prefetching, which can minimize latency to store frequently accessed data in memory. Moreover, this can provide data compression and efficient storage without sacrificing query performance with fault tolerance and recovery.

In some embodiments, the query processing module 108 is configured to receive user queries from the user device 102. In some embodiments, the query processing module 108 is configured to initiate a semantic searching of the query to identify close attributes.

In some embodiments, the semantic searching module 110 is configured to execute a semantic search of the user query received from the user device 102. For example, the semantic searching module 110 can execute the semantic search of the query within the database 124. The semantic searching module 110 can execute the search to identify attributes that are semantically close to the original user query. In some embodiments, executing the semantic search of the query within the database can include executing a searching using cosine similarity techniques. In some embodiments, cosine similarity can measure the cosine of the angle between the two vectors. In some embodiments, cosine similarity can be useful when the magnitude of the vectors is not as relevant as the orientation (i.e., the direction or pattern of the data). Cosine similarity is often used in text analysis where the presence or absence of specific terms (and their relative frequencies) is more desirable than the absolute term counts. In some embodiments, executing the semantic search can include a combination of semantic and lexical searching, for example by performing the search on the vector store, which allows natural language-based searching in an effective and easy manner.

In some embodiments, the extraction module 112 is configured to extract a canonical attribute name from the attributes identified by the semantic searching module 110. As discussed above, the canonical attribute name can be stored in the metadata for a specific field within the database 124, so the extraction module 112 can therefore be configured to access this metadata and extract the canonical attribute name once a particular attribute is identified as being semantically similar to the user query.

In some embodiments, the schema generation module 114 is configured to generate an LLM input schema based on the identified and extracted canonical attribute names. For example, the schema generation module 114 can apply a rule-based algorithm based on the number of fields identified by the semantic searching module 110, and this algorithm can construct a minimum viable schema. Specifically, the algorithm can include the steps of identifying a number of fields that result from the results of the semantic search techniques and generating a schema that includes the same number of identified fields. Such an algorithm can therefore ensure that the same number of fields is present in the schema once it is constructed, reducing superfluous or unnecessary fields and leading to the construction of a "minimum viable" schema. In some embodiments, the algorithm can include also adding additional information to the schema to access the identified fields in a valid manner, such as higher-level fields. For example, in the case of a field with a path of "C360PersonAccount.insights.txld", the fields "C360PersonAccount," "insights," and "txld" would need to be included to construct a minimum viable schema, otherwise a full valid path would not be created. Moreover, this can be included for each path discovered in the semantic searching step. Then, schema generation module 114 can feed the generated LLM input schema as an input to the LLM module 116.

In some embodiments, the LLM module 116 includes an LLM, such as e.g., GPT-3,-3.5,-4, PaLM, Ernie Bot, LLaMa, and others. In some embodiments, an LLM can include various transformed-based models trained on vast corpuses of data that utilize an underlying neural network. In some embodiments, the LLM module 116 can receive an LLM input schema and the original user query as inputs and generate a response thereto. In some embodiments, the LLM module 116 can generate a natural language response that can be displayed to the user describing a specific type of attribute. In some embodiments, the LLM module 116 can also generate a query (e.g., a GraphQL query) that can be provided to the user.

Figure 2:
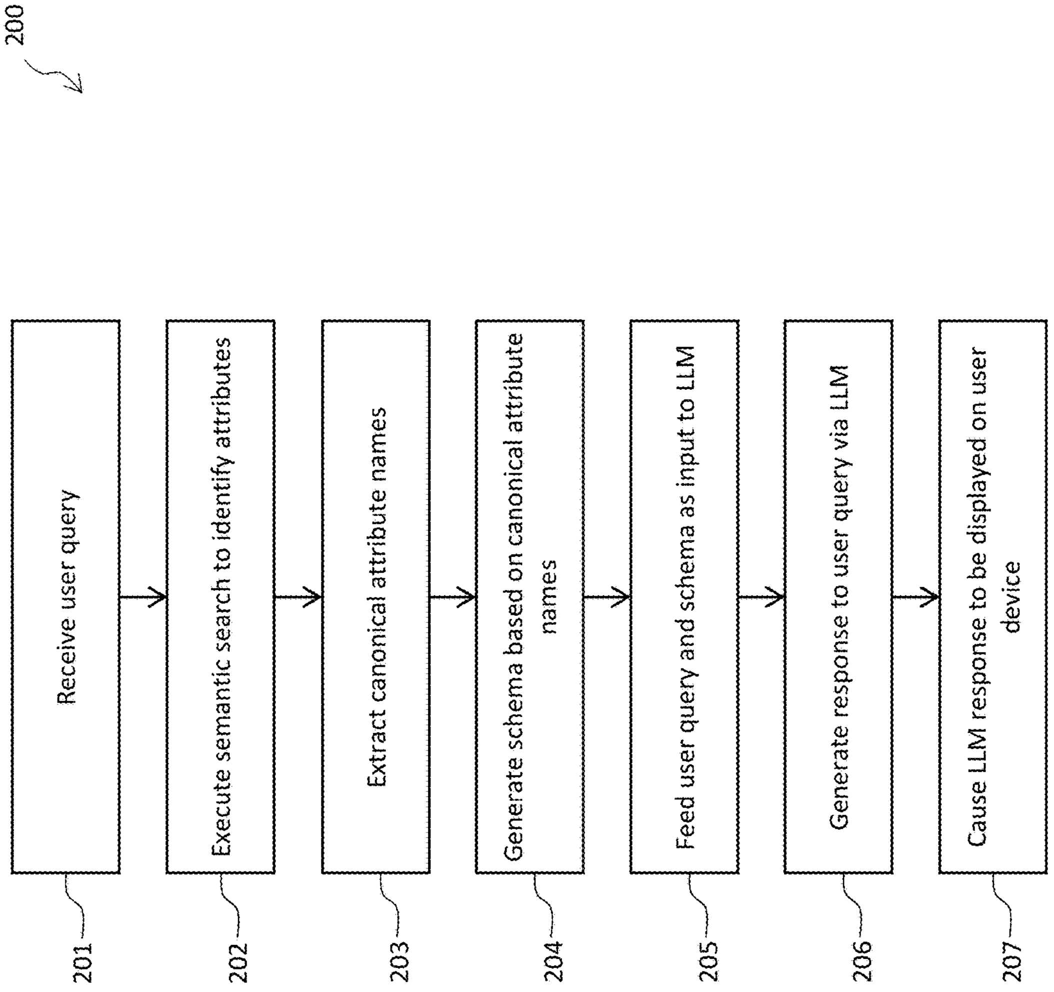
FIG. 2 is a flowchart of an example enhanced schema discovery and query generation process according to example embodiments of the present disclosure.

FIG. 2 is a flowchart of an example enhanced schema discovery and query generation process 200 according to example embodiments of the present disclosure. In some embodiments, the process 200 can be performed by the server 106 and its various modules. At block 201, the query processing module 108 receives a user query from the user device 102. For example, the user query can be entered into a UI 120 (see FIG. 3) that displays a chatbot that allows the user to communicate with the server 106. A first example user query could be "What data attributes are available for C360 Person Account?" A second example user query could be "Help me build a GraphQL query to retrieve event timestamp, ID, test status, latest visitor ID, namespace, replace CK import consent date, and transaction ID for a C360 person account with a given input parameter."

At block 202, the semantic searching module 110 executes a semantic search of the received user query against the database 124 to identify similar attributes. In some embodiments, prior to executing the semantic search, the semantic searching module 110 can vectorize the user query, such as via various vectorization techniques including, but not limited to, a word2vec model or other embedding frameworks, such as as GloVe (Global Vector) or FastText. Fields or attributes that can be identified for either the first or second example user query can include

['C360__PersonAccount.event__timestamp', 'C360__PersonAccount.id', 'C360__PersonAccount.isTest', 'C360__PersonAccount.latestVisitorId'. 'C360__PersonAccount.namespace', 'C360__PersonAccount.replayCkImportConsentDate', 'C360__PersonAccount.txnId'].

At block 203, the extraction module 112 extracts canonical attribute names for the attributes identified at block 202. As discussed above in relation to FIG. 1, the canonical attribute names can be stored in the metadata of certain fields within the database 124. At block 204, the schema generation module 114 generates an LLM input schema based on the extracted canonical attribute names. In some embodiments, the schema generation module 114 can generate the LLM input schema via an algorithm that applies rules regarding the number of fields identified by the semantic searching module 110. For example, generating the LLM input schema can include identifying a number of fields that result from the results of the semantic search techniques and generating a schema that includes the same number of identified fields. In addition, in some embodiments, the schema generation module 114 can add additional information to the schema to access the identified fields in a valid manner, such as higher-level fields. Moreover, an example LLM input schema 300 for the first and second user query examples discussed above is shown in FIG. 3.

At block 205, the server 106 feeds the received user query and the LLM input schema to the LLM module 116. At block 206, the LLM module 116 generates a response to the received user query. As discussed above, by reducing the size of the schema provided to the LLM module 116, accuracy can be improved and hallucinations and latencies can be reduced. At block 207, the server 106 causes the response from the LLM module 116 to be displayed on the user device 102, such as via UI tools 120. An example response for the first example user query can include the following: "The data attributes available for C360 Person Account are:

'C360__PersonAccount.event__timestamp', 'C360__PersonAccount.id', 'C360__PersonAccount.isTest', 'C360__PersonAccount.latestVisitorId'. 'C360__PersonAccount.namespace', 'C360__PersonAccount.replayCkImportConsentDate', 'C360__PersonAccount.txnId'." In some embodiments, the LLM module 116 can include a source citation in the response displayed on the user device. In addition, an example response 400 for the second example user query is shown in FIG. 4, which includes a GraphQL query that can be used by the user.

Figure 5:
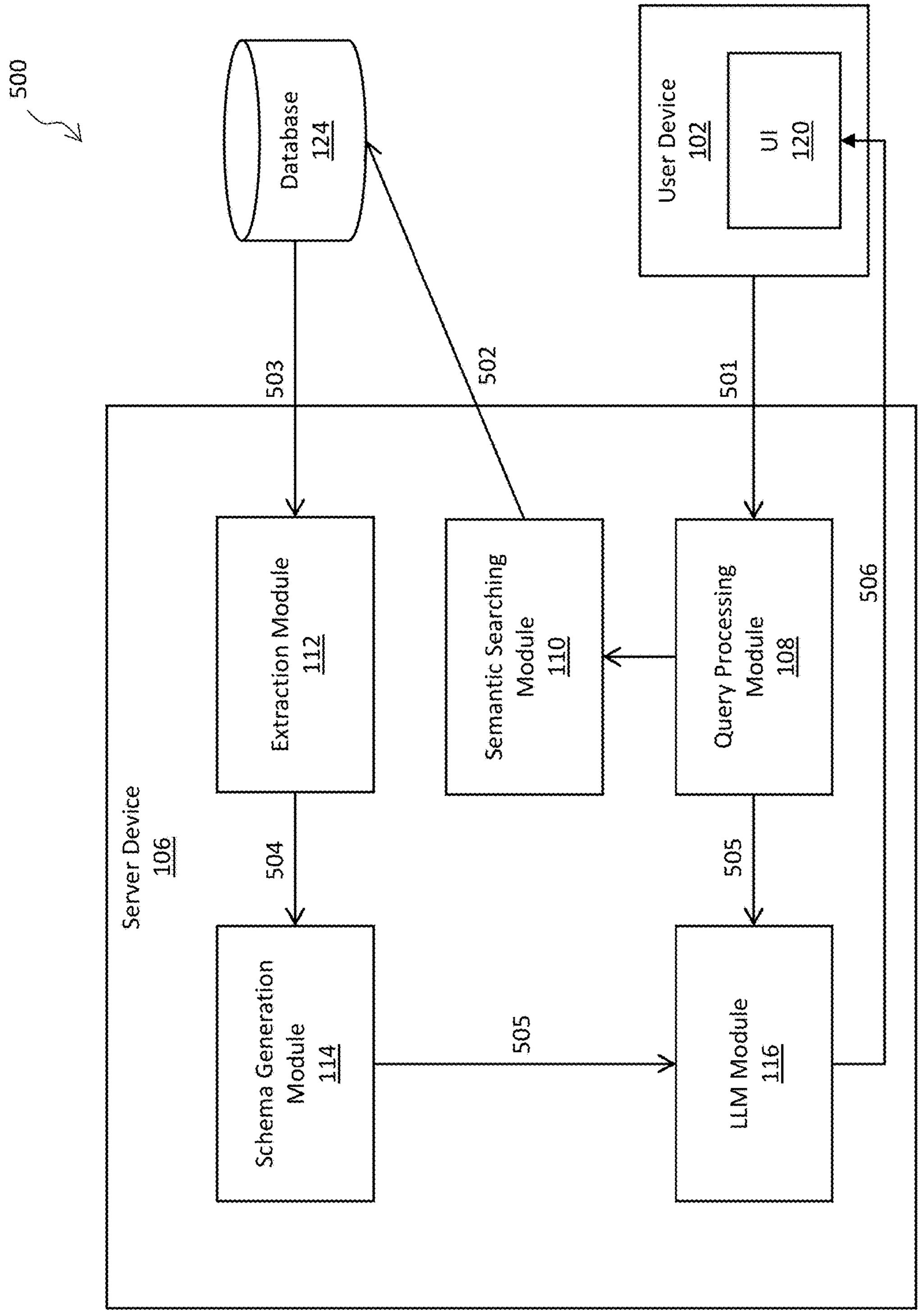
FIG. 5 is an example architecture for enhanced schema discovery and query generation according to example embodiments of the present disclosure.

FIG. 5 is an example architecture 500 for enhanced schema discovery and query generation according to example embodiments of the present disclosure. The architecture 500 illustrates the flow of process 200 among various modules of the server 106 and the user device 102. At 501, the query processing module 108 receives the user query from the UI tools 120 of the user device 102. For example, a user may interact with a chatbot via the UI tools 120 and manually enter a request or question. At 502, the received query is utilized by the semantic searching module 110 to execute a semantic search against the database 124 to identify attributes similar to or associated with the received user query.

At 503, once semantically similar attributes are identified within the database 124, the extraction module 112 extracts canonical attribute names for such identified attributes. At 504, the extraction module 112 transmits the extracted canonical attribute names to the schema generation module 114. Once the schema generation module 114 generates an LLM input schema using the extracted canonical attribute names, it can be provided to the LLM module 116 at 505, along with the original user query. The LLM module 116 can generate a response to the user query by analyzing the LLM input schema and the user query, which is provided for display via the UI tools 120 at 506.

Figure 6:
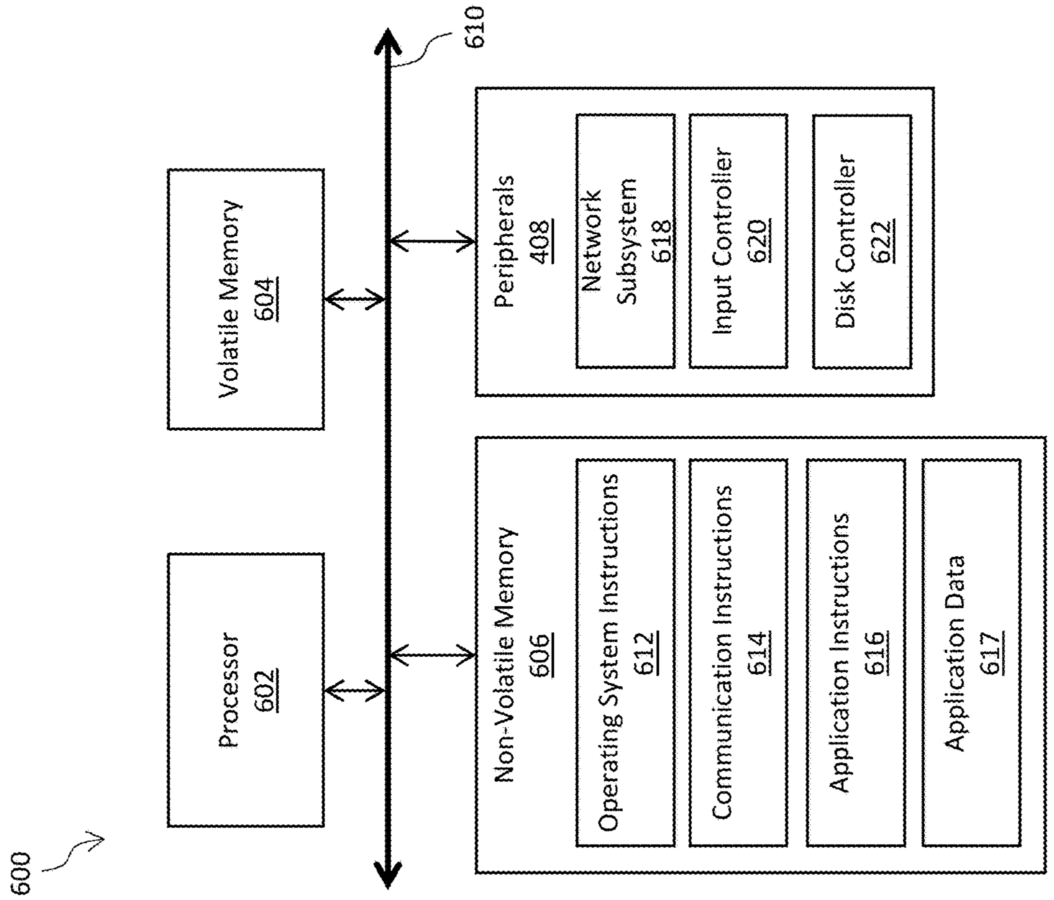
FIG. 6 is server device that can be used within the system of FIG. 1 according to an embodiment of the present disclosure.

FIG. 6 is a diagram of an example server device 600 that can be used within system 100 of FIG. 1. Server device 600 can implement various features and processes as described herein. Server device 600 can be implemented on any electronic device that runs software applications derived from complied instructions, including without limitation personal computers, servers, smart phones, media players, electronic tablets, game consoles, email devices, etc. In some implementations, server device 600 can include one or more processors 602, volatile memory 604, non-volatile memory 606, and one or more peripherals 608. These components can be interconnected by one or more computer buses 610.

Processor(s) 602 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 610 can be any known internal or external bus technology, including but not limited to ISA, EISA, PCI, PCI Express, USB, Serial ATA, or FireWire. Volatile memory 604 can include, for example, SDRAM. Processor 602 can receive instructions and data from a read-only memory or a random access memory or both. Essential elements of a computer can include a processor for executing instructions and one or more memories for storing instructions and data.

Non-volatile memory 606 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 606 can store various computer instructions including operating system instructions 612, communication instructions 614, application instructions 616, and application data 617. Operating system instructions 612 can include instructions for implementing an operating system (e.g., Mac OS®, Windows®, or Linux). The operating system can be multi-user, multiprocessing, multitasking, multithreading, real-time, and the like. Communication instructions 614 can include network communications instructions, for example, software for implementing communication protocols, such as TCP/IP, HTTP, Ethernet, telephony, etc. Application instructions 616 can include instructions for various applications. Application data 617 can include data corresponding to the applications.

Peripherals 608 can be included within server device 600 or operatively coupled to communicate with server device 600. Peripherals 608 can include, for example, network subsystem 618, input controller 620, and disk controller 622. Network subsystem 618 can include, for example, an Ethernet of WiFi adapter. Input controller 620 can be any known input device technology, including but not limited to a keyboard (including a virtual keyboard), mouse, track ball, and touch-sensitive pad or display. Disk controller 622 can include one or more mass storage devices for storing data files; such devices include magnetic disks, such as internal hard disks and removable disks; magneto-optical disks; and optical disks.

Figure 7:
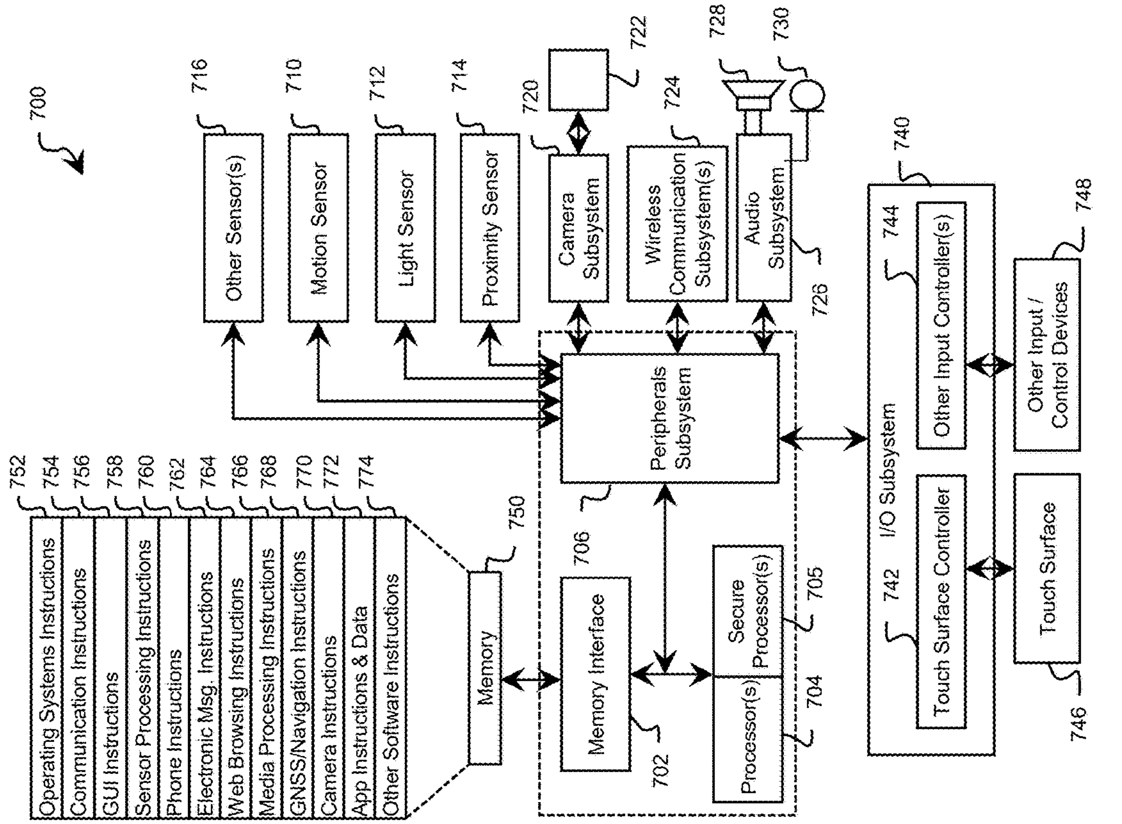
FIG. 7 is an example computing device that can be used within the system of FIG. 1 according to an embodiment of the present disclosure.

FIG. 7 is an example computing device that can be used within the system 100 of FIG. 1, according to an embodiment of the present disclosure. In some embodiments, device 700 can be user device 102. The illustrative user device 700 can include a memory interface 702, one or more data processors, image processors, central processing units 704, and or secure processing units 705, and peripherals subsystem 706. Memory interface 702, one or more central processing units 704 and or secure processing units 705, and or peripherals subsystem 706 can be separate components or can be integrated in one or more integrated circuits. The various components in user device 700 can be coupled by one or more communication buses or signal lines.

Sensors, devices, and subsystems can be coupled to peripherals subsystem 706 to facilitate multiple functionalities. For example, motion sensor 710, light sensor 712, and proximity sensor 714 can be coupled to peripherals subsystem 706 to facilitate orientation, lighting, and proximity functions. Other sensors 716 can also be connected to peripherals subsystem 706, such as a global navigation satellite system (GNSS) (e.g., GPS receiver), a temperature sensor, a biometric sensor, magnetometer, or other sensing device, to facilitate related functionalities.

Camera subsystem 720 and optical sensor 722, e.g., a charged coupled device (CCD) or a complementary metal-oxide semiconductor (CMOS) optical sensor, can be utilized to facilitate camera functions, such as recording photographs and video clips. Camera subsystem 720 and optical sensor 722 can be used to collect images of a user to be used during authentication of a user, e.g., by performing facial recognition analysis.

Communication functions can be facilitated through one or more wired and or wireless communication subsystems 724, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 724. The specific design and implementation of communication subsystems 724 can depend on the communication network(s) over which the user device 700 is intended to operate. For example, user device 700 can include communication subsystems 724 designed to operate over a GSM network, a GPRS network, an EDGE network, a WiFi or WiMax network, and a Bluetooth™ network. For example, wireless communication subsystems 724 can include hosting protocols such that device 700 can be configured as a base station for other wireless devices and or to provide a WiFi service.

Audio subsystem 726 can be coupled to speaker 728 and microphone 730 to facilitate voice-enabled functions, such as speaker recognition, voice replication, digital recording, and telephony functions. Audio subsystem 726 can be configured to facilitate processing voice commands, voice-printing, and voice authentication, for example.

I/O subsystem 740 can include a touch-surface controller 742 and or other input controller(s) 744. Touch-surface controller 742 can be coupled to a touch-surface 746. Touch-surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 746.

The other input controller(s) 744 can be coupled to other input/control devices 748, such as one or more buttons, rocker switches, thumb-wheel, infrared port, USB port, and or a pointer device such as a stylus. The one or more buttons (not shown) can include an up/down button for volume control of speaker 728 and or microphone 730.

In some implementations, a pressing of the button for a first duration can disengage a lock of touch-surface 746; and a pressing of the button for a second duration that is longer than the first duration can turn power to user device 700 on or off. Pressing the button for a third duration can activate a voice control, or voice command, module that enables the user to speak commands into microphone 730 to cause the device to execute the spoken command. The user can customize a functionality of one or more of the buttons. Touch-surface 746 can, for example, also be used to implement virtual or soft buttons and or a keyboard.

In some implementations, user device 700 can present recorded audio and or video files, such as MP3, AAC, and MPEG files. In some implementations, user device 700 can include the functionality of an MP3 player, such as an iPod™. User device 700 can, therefore, include a 36-pin connector and or 8-pin connector that is compatible with the iPod. Other input/output and control devices can also be used.

Memory interface 702 can be coupled to memory 750. Memory 750 can include high-speed random access memory and or non-volatile memory, such as one or more magnetic disk storage devices, one or more optical storage devices, and or flash memory (e.g., NAND, NOR). Memory 750 can store an operating system 752, such as Darwin, RTXC, LINUX, UNIX, OS X, Windows, or an embedded operating system such as VxWorks.

Operating system 752 can include instructions for handling basic system services and for performing hardware dependent tasks. In some implementations, operating system 752 can be a kernel (e.g., UNIX kernel). In some implementations, operating system 752 can include instructions for performing voice authentication.

Memory 750 can also store communication instructions 754 to facilitate communicating with one or more additional devices, one or more computers and or one or more servers. Memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic messaging-related process and functions; web browsing instructions 764 to facilitate web browsing-related processes and functions; media processing instructions 766 to facilitate media processing-related functions and processes; GNSS/Navigation instructions 768 to facilitate GNSS and navigation-related processes and instructions; and or camera instructions 770 to facilitate camera-related processes and functions.

Memory 750 can store application (or "app") instructions and data 772, such as instructions for the apps described above in the context of FIGS. 1-3. Memory 750 can also store other software instructions 774 for various other software applications in place on device 700. The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112(f).

The invention claimed is:

1. A computing system comprising:

a processor; and a non-transitory computer-readable storage device storing computer-executable instructions, the instructions operable to cause the processor to perform operations comprising:

chunking a supergraph into a plurality of chunks, each chunk comprising an attribute name, an attribute description, and a canonical attribute name;

embedding the plurality of chunks into a vector database;

receiving a natural language user query from a user device for generating a data query related to the supergraph;

executing, based on the user query, a semantic search within the vector database to identify one or more attributes for generating the data query;

extracting a canonical attribute name for each of the identified one or more attributes;

generating a large language model (LLM) schema based on the extracted canonical attribute name;

feeding the user query and the LLM schema to an LLM;

generating a response to the user query via the LLM, the response comprising the data query or one or more attributes related to the data query; and causing the response to be displayed on the user device.

2. The computing system of claim 1, wherein executing the semantic search within the vector database comprises semantically searching an attribute schema of a schematized language.

3. The computing system of claim 2, wherein semantically searching the attribute schema comprises semantically searching a plurality of chunks within the vector database, each chunk comprising an attribute name, an attribute description, and the associated canonical attribute name.

4. The computing system of claim 3, wherein the canonical attribute name comprises an associated attribute path from a root node to a leaf node.

5. The computing system of claim 1, wherein extracting the canonical attribute name comprises extracting the canonical attribute name from metadata of a vector field.

6. The computing system of claim 1, wherein receiving the user query comprises receiving a query comprising a request for one or more attributes.

7. The computing system of claim 6, wherein generating the response to the user query via the LLM comprises generating a natural language response comprising the one or more attributes.

8. The computing system of claim 1, wherein receiving the user query comprises receiving a query comprising a request for a query in a schematized language.

9. The computing system of claim 8, wherein generating the response to the user query via the LLM comprises generating a response comprising the query in the schematized language.

10. The computing system of claim 1, wherein generating the LLM schema based on the extracted canonical attribute name comprises generating a minimum viable schema by:

identifying a number of the one or more attributes from the semantic search; and generating the minimum viable schema comprising a same number of attributes.

11. A computer-implemented method, performed by at least one processor, comprising:

chunking a supergraph into a plurality of chunks, each chunk comprising an attribute name, an attribute description, and a canonical attribute name;

embedding the plurality of chunks into a vector database;

receiving a natural language user query from a user device for generating a data query related to the supergraph;

executing, based on the user query, a semantic search within the vector database to identify one or more attributes for generating the data query;

extracting a canonical attribute name for each of the identified one or more attributes;

generating a large language model (LLM) schema based on the extracted canonical attribute name;

feeding the user query and the LLM schema to an LLM;

generating a response to the user query via the LLM, the response comprising the data query or one or more attributes related to the data query; and causing the response to be displayed on the user device.

12. The computer-implemented method of claim 11, wherein executing the semantic search within the vector database comprises semantically searching an attribute schema of a schematized language.

13. The computer-implemented method of claim 12, wherein semantically searching the attribute schema comprises semantically searching a plurality of chunks within the vector database, each chunk comprising an attribute name, an attribute description, and the associated canonical attribute name.

14. The computer-implemented method of claim 13, wherein the canonical attribute name comprises an associated attribute path from a root node to a leaf node.

15. The computer-implemented method of claim 11, wherein extracting the canonical attribute name comprises extracting the canonical attribute name from metadata of a vector field.

16. The computer-implemented method of claim 11, wherein receiving the user query comprises receiving a query comprising a request for one or more attributes.

17. The computer-implemented method of claim 16, wherein generating the response to the user query via the LLM comprises generating a natural language response comprising the one or more attributes.

18. The computer-implemented method of claim 11, wherein receiving the user query comprises receiving a query comprising a request for a query in a schematized language.

19. The computer-implemented method of claim 18, wherein generating the response to the user query via the LLM comprises generating a response comprising the query in the schematized language.

20. The computer-implemented method of claim 11, wherein generating the LLM schema based on the extracted canonical attribute name comprises generating a minimum viable schema by:

identifying a number of the one or more attributes from the semantic search; and generating the minimum viable schema comprising a same number of attributes.

* * * * *